United States Patent
Kitahara

(10) Patent No.: US 9,211,763 B2
(45) Date of Patent: Dec. 15, 2015

(54) PNEUMATIC TIRE

(75) Inventor: Kouta Kitahara, Kodaira (JP)

(73) Assignee: BRIDGESTONE CORPORATION, Tokyo (JP)

(*) Notice: Subject to any disclaimer, the term of this patent is extended or adjusted under 35 U.S.C. 154(b) by 137 days.

(21) Appl. No.: 13/880,869

(22) PCT Filed: Nov. 8, 2011

(86) PCT No.: PCT/JP2011/075722
§ 371 (c)(1), (2), (4) Date: Apr. 22, 2013

(87) PCT Pub. No.: WO2012/063819
PCT Pub. Date: May 18, 2012

(65) Prior Publication Data
US 2013/0206308 A1 Aug. 15, 2013

(30) Foreign Application Priority Data
Nov. 8, 2010 (JP) ................................. 2010-249504

(51) Int. Cl.
- *B60C 9/20* (2006.01)
- *B60C 9/28* (2006.01)
- *B60C 9/00* (2006.01)
- *D07B 1/06* (2006.01)

(52) U.S. Cl.
CPC .............. *B60C 9/0007* (2013.04); *D07B 1/062* (2013.01); *B60C 9/2006* (2013.04); *B60C 9/28* (2013.01); *D07B 1/0626* (2013.01); *D07B 2201/206* (2013.01); *D07B 2201/2006* (2013.01); *D07B 2201/2018* (2013.01);
(Continued)

(58) Field of Classification Search
CPC .... B60C 9/18; B60C 9/28; B60C 2009/2067; B60C 2009/2074; B60C 2009/2083; B60C 2009/28
See application file for complete search history.

(56) References Cited

U.S. PATENT DOCUMENTS

| | | | |
|---|---|---|---|
| 5,718,783 A * | 2/1998 | Ikehara | 152/527 |
| 5,802,829 A | 9/1998 | Yamanaka | |
| 2011/0253280 A1* | 10/2011 | Matsuo | 152/526 |

FOREIGN PATENT DOCUMENTS

| | | |
|---|---|---|
| CN | 1157224 A | 8/1997 |
| EP | 0399795 A1 | 11/1990 |

(Continued)

OTHER PUBLICATIONS

International Search Report for PCT/JP2011/075722 dated Feb. 21, 2012.
(Continued)

*Primary Examiner* — Justin Fischer
(74) *Attorney, Agent, or Firm* — Sughrue Mion, PLLC

(57) ABSTRACT

To provide a pneumatic tire wherein the lightweight properties of a tire is secured while improving the plunger energy and BES resistance thereof, which is particularly suitable for tires for a large passenger car or extra load tires.

A pneumatic tire comprising a carcass 1 as a skeleton, and at least two belt layers 2a, 2b each formed by rubberizing a plurality of steel cords arranged obliquely with respect to the tire circumferential direction on the outside in the tire radial direction of the crown portion of the carcass is provided. The steel cord is composed of two or more core wires and five to seven sheath wires twisted together around the core wires; the interval between adjacent steel cords in the belt layer is more than 1.0 mm and not more than 1.50 mm; and the gauge of the belt layer is not less than 1.20 mm and not more than 1.60 mm.

2 Claims, 2 Drawing Sheets

(52) U.S. Cl.
CPC ............... *D07B 2201/2023* (2013.01); *D07B 2201/2029* (2013.01); *D07B 2201/2051* (2013.01)

(56) References Cited

FOREIGN PATENT DOCUMENTS

| JP | 6-10280 A | 1/1994 |
|---|---|---|
| JP | 7164819 A | 6/1995 |
| JP | 827683 A | 1/1996 |
| JP | 9-156314 A | 6/1997 |
| JP | 9-158066 A | 6/1997 |
| JP | 10-25678 A | 1/1998 |
| JP | 10121388 A | 5/1998 |
| JP | 11-192810 A | 7/1999 |
| JP | 11310005 A | 11/1999 |
| JP | 2002-180387 A | 6/2002 |
| JP | 2005-120491 A | 5/2005 |
| JP | 2007-63724 A | 3/2007 |
| JP | 200763724 A | 3/2007 |
| JP | 2007-90937 A | 4/2007 |
| KR | 2005014371 * | 2/2005 |
| WO | 2010/073641 A1 | 7/2010 |

OTHER PUBLICATIONS

Japanese Office Action, dated Apr. 18, 2014, issued in corresponding Japanese Patent Application No. 2010-249504.
Communication dated Feb. 28, 2015 from the State Intellectual Property Office of People's Republic of China in counterpart Application No. 201180053825.4.

* cited by examiner

PNEUMATIC TIRE

TECHNICAL FIELD

The present invention relates to a pneumatic tire (hereinafter, also simply referred to as "tire"), and more specifically, to a pneumatic tire which is used under high inner pressure or high load and which is preferably used as a tire for a large passenger car or as an extra load tire.

BACKGROUND ART

Recently, with increasing size of vehicles, there is also an increasing need for a large passenger car tire. In response to user's request for improvement of tire performance and appearance, a so-called "extra load tire" setting is increasing, in which a usage under high inner pressure and high load is possible.

Examples of a performance which is demanded for a belt cord or a belt treat for such an extra load tire or a tire for a large passenger car include a resistance represented by regulations related to plunger energy or belt edge separation resistance (belt edge separation; hereinafter, also referred to as "BES").

Among these, although the plunger energy is determined by the design of a whole tire, and not determined only by changing the material of the belt, increase in belt strength results in increase in the plunger energy since the belt strength also has a large influence. The use of cross belt layer for a pneumatic tire generates an interlayer shear strain between two belt layers to thereby generate a BES. In particular, since a tire for a large passenger car or an extra load tire is assumed to be used under severe environments such as under high inner pressure or high load, shear strain at the edge of a belt layer is higher than that of normal tires, and therefore, when the same material or the same structure as those of normal tires is employed, a BES is likely to occur, which is problematic.

In general, a steel cord for a tire needs to have an excellent rubber penetration property and to be lightweight and inexpensive. The former, the rubber penetration property is important for preventing the progression of corrosion in the cord when the tire is cut due to a nail or the like. Regarding the latter, from the viewpoint of considering global environment, for contributing to "REDUCE", one of "3R", the lighter the better, which means small amount of material to be used, leading to resource saving. When an expensive material is used, it becomes difficult for the tire to be prevailed in public, and therefore the cost needs to be low.

As an improvement technology relating to a steel cord as a reinforcing member for a belt, Patent Document 1 discloses a steel cord for reinforcing a rubber article comprising a core composed of two wires and having an average twisting pitch of at least 30 mm and a sheath composed of six wires which is wound around the core, wherein the ratio of the diameter ds of the wire of the sheath with respect to the diameter dc of the wire constituting the core ((ds/dc)×100) is in a range of 58.0% <ds/dc<161.5%. Patent Document 2 discloses a steel cord comprising a core composed of two filaments having the same diameter which are arranged in parallel without being twisted together and a sheath composed of six filaments having the same diameter as that of the core filament which has been wound around the core, wherein there is a gap between the sheath filaments and an arrangement of the sheath filaments in which at least two gaps have a spacing of ⅓d or more with respect to the diameter of the filament d appears at least once per one twist length of the sheath.

Further, Patent Document 3 discloses a steel cord for reinforcing a rubber article comprising a core in which two core wires are arranged in parallel without being twisted together and 5 to 7 sheath wires which are twisted together around the core, wherein the cross-section shape of the cord is substantially an ellipse, the diameter dc (mm) of the cord wire satisfies the range of 0.05≤dc<0.26, the diameter ds (mm) of the sheath wire satisfies the range of 0.05≤ds<0.26 and the ratio of the diameter dc of the core wire to the diameter ds of the sheath wire dc/ds satisfies the relationship of 0.7<dc/ds<1. Still further, Patent Document 4 discloses a pneumatic radial tire wherein, as a steel cord to be applied to a cross belt layer, one having a single ply structure or a core-single layer sheath structure composed of 6 to 10 steel wires having a wire diameter of 0.10 to 0.20 mm is employed; the end count thereof is 40/50 mm or more; and the distance between adjacent steel cords in the belt layer is 0.3 mm or more.

RELATED ART DOCUMENTS

Patent Documents

Patent Document 1: Japanese Unexamined Patent Application Publication No. 119-158066(claims and the like)
Patent Document 2: Japanese Unexamined Patent Application Publication No. 2005-120491(claims and the like)
Patent Document 3: Japanese Unexamined Patent Application Publication No. 2007-63724(claims and the like)
Patent Document 4: Japanese Unexamined Patent Application Publication No. 2007-90937(claims and the like)

SUMMARY OF THE INVENTION

Problems to be Solved by the Invention

As mentioned above, for a steel cord used as a belt reinforcing member for a tire, a variety of constitutions have been conventionally proposed. There has not been, however, a sufficient technique which satisfies a variety of needs for a tire for a large passenger car or an extra load tire as mentioned above.

Accordingly, an object of the present invention is to overcome the above mentioned problems and to provide a pneumatic tire wherein the lightweight properties of a tire is secured while improving the plunger energy and BES resistance thereof, which is particularly suitable for tires for a large passenger car or extra load tires.

Means for Solving the Problems

The present inventor intensively studied to discover that the above-mentioned problems can be overcome by using as a belt layer steel cords having a specific structure and defining the interval between adjacent steel cords in the belt layer and the gauge of the belt layer in predetermined ranges, respectively, thereby completing the present invention.

In other words, the pneumatic tire of the present invention is a pneumatic tire comprising at least one carcass extending toroidally between a pair of bead portions as a skeleton, and at least two belt layers each formed by rubberizing a plurality of steel cords arranged obliquely with respect to the tire circumferential direction on the outside in the tire radial direction of the crown portion of the carcass, wherein the steel cord is composed of two or more core wires and five to seven sheath wires twisted together around the core wires; the interval between adjacent steel cords in the belt layer is more than 1.0 mm and not more than 1.50 mm; and the gauge of the belt layer is not less than 1.20 mm and not more than 1.60 mm.

In the tire of the present invention, it is preferred that, in the steel cord, the core wires be arranged in parallel without being twisted together. It is also preferred that the wire diameter dc of the core wire differ from the wire diameter ds of the sheath wire. In this case, preferably, the ratio of the wire diameter ds of the sheath wire to the wire diameter dc of the core wire satisfies ds/dc>1.2. Further, preferably the number of the core wire is two.

Effects of the Invention

By the present invention, by employing the above-mentioned constitution, a pneumatic tire wherein the lightweight properties of a tire is secured while improving the plunger energy and BES resistance thereof, which is particularly suitable for tires for a large passenger car or extra load tires, can be attained.

MODES FOR CARRYING OUT THE INVENTION

In the following, embodiments of the present invention will be explained with reference to the Drawings.

Figure 1:
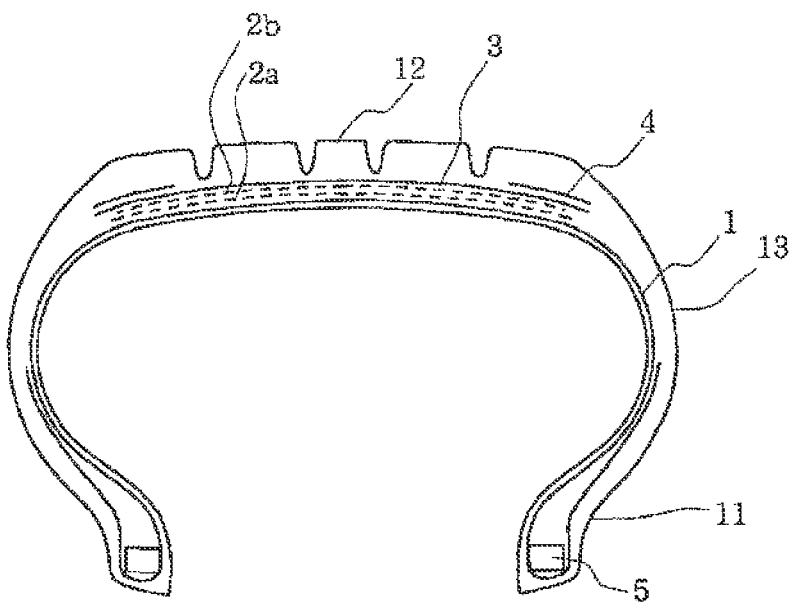
FIG. 1 is a width-direction cross-section illustrating one example of a pneumatic tire of the present invention.

FIG. 1 illustrates a width-direction cross-section of one example of a pneumatic tire of the present invention. As illustrated, a pneumatic tire of the present invention comprises one carcass 1 extending toroidally between a pair of bead portions 11 as a skeleton, and two belt layers 2a, 2b on the outside in the tire radial direction of the crown portion of the carcass.

Although in the illustrated example, there is depicted one carcass 1, two or more carcasses may be used. Preferably, 1 to 2 layers may be used. Belt layers 2a, 2b are formed by rubberizing a plurality of steel cords arranged obliquely in an angle of 15 to 40° with respect to the tire circumferential direction. Although in the illustrated example, there are depicted two belt layers, three or more belt layers, for example two to four belt layers may be provided.

In the present invention, as a steel cord used for such belt layers 2a, 2b, the one comprising two or more core wires and five to seven sheath wires twisted together around the core wires and having an M+N structure (M≥2, N=5 to 7) is employed. As mentioned below, in order to secure an interval between adjacent steel cords in a belt layer while securing the total strength of the belt, the number of wires twisted together for one cord is the more, the better. In this respect, when the number of the filaments is, for example, as many as seven or more in a cord having a 1×N structure, it becomes difficult to secure the cord properties. On the other hand, in the case of using a cord having an M+N structure, since it is possible to increase the number of the filaments to be twisted together compared with the case of the cord having a 1×N structure, it becomes easy to secure the total strength.

Although the number of the core wires may be two or more, since it sometimes becomes difficult to maintain appropriate properties when the number is three or more, the number is preferably two. Although the core wires may be twisted together, it is preferred that the core wires be arranged in parallel without being twisted together because the lightweight thereof can be maintained since the gauge can be made thin when a treat is formed by rubberizing. Further, since cords having a multi-twisted structure has a large gauge and therefore a large weight as well as the cost of the cord itself is expensive, the above-mentioned M+N structure is employed for the present invention.

Figure 2:
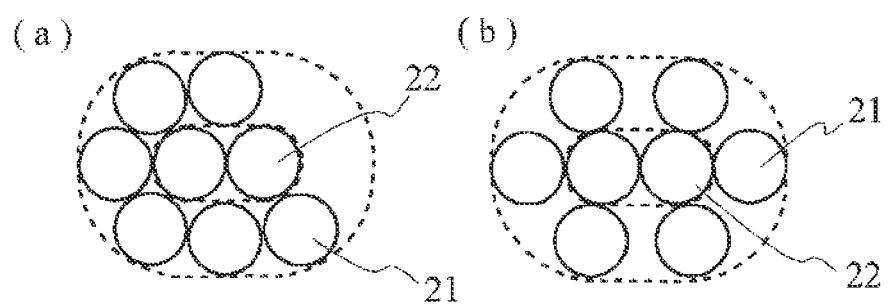
FIG. 2(a), (b) are width-direction cross-sections illustrating sheath wires in a cord in a dispersed state.

In the present invention, the cord diameter of a steel cord and the wire diameters of a core wire and a sheath wire are not particularly restricted, and preferably, the wire diameter dc of the core wire differs from the wire diameter ds of the sheath wire. in particular, when the wire diameter of the sheath wire is larger than the wire diameter of the core wire, a gap between the sheath wires which is large enough for rubber to penetrate uniformly inside the cord can be secured, and in addition, the fear of deterioration of fatigue resistance or deformation following properties of core wires which are not twisted disappears. More preferably, the ratio of the wire diameter ds of the sheath wire to the wire diameter dc of the core wire satisfies ds/dc>1.2. Specifically, when the number of the sheath wire is five, the ratio satisfies 2.7>ds/dc>1.2; when the number of the sheath wire is six, the ratio satisfies 1.8>ds/dc>1.2; and when the number of the sheath wire is seven, the ratio satisfies 1.3>ds/dc>1.2. By making the core wire thin, and the sheath wire thick, the bias of sheath wires 21 in the cross-section of a cord having an M+N structure as illustrated in FIG. 2(a) can be prevented, and sheath wires 21 can be appropriately dispersed around the core wires 22 as illustrated in FIG. 2(b), whereby the rubber penetration property can be made favorable. By thinning the cord, a lightweight effect can also be obtained. Still further, in the present invention, it is also preferable that the major axis and the minor axis of the above-mentioned cord satisfies (the major axis/the minor axis)>1.10. By this, the cross-section of the cord can be made in a flat shape, and the strength of weight of the cord can be highly combined.

In the present invention, intervals between adjacent steel cords in the belt layers 2a, 2b are set to more than 1.0 mm and not more than 1.50 mm. By using the above mentioned steel cord having an M+N structure and by setting the cord interval in a range of more than 1.0 mm which is wider than that of a normal cord, the occurrence of BES can be effectively inhibited even in the case where the present invention is applied to a tire used under severe conditions such as an extra load tire. In cases where the above-mentioned cord interval is 1.0 mm or lower, the BES resistance deteriorates; and in cases where the above-mentioned cord interval is more than 1.50 mm, the rigidity of the belt decreases leading to a problem of a variety of performances of a tire such as retention of shape. In either of the cases, an expected effect cannot be obtained. In the present invention, the above-mentioned cord interval means a distance between the cords when observed in a cross-section of the steel cord in the vertical direction. In the present invention, the end count of the steel cords in the belt layers 2a, 2b is not particularly restricted as long as the above-mentioned cord interval is satisfied.

Further, in the present invention, the gauges of the belt layers 2a, 2b are from 1.20 mm to 1.60 mm. In cases where the gauge of the belt layer is less than 1.20 mm, the interlayer strain during deformation becomes large and the BES resistance deteriorates; in cases where the gauge is larger than 1.60 mm, the weight of the layer increases too much. In either of the cases, an expected effect cannot be obtained.

In the tire of the present invention, by using the above-mentioned steel cord having an M+N structure and by satisfying the conditions of the above-mentioned cord interval and gauge of the belt layer, the plunger energy and BES resistance can be improved while maintaining the lightweight properties. The present invention has an advantage in that particularly even in cases where it is applied to a tire used under severe conditions such as a tire for a large passenger car or an extra load tire, the BES resistance can be secured without deteriorating the lightweight properties and the plunger energy.

The present invention is not particularly restricted as long as the conditions relating to the above-mentioned conditions are satisfied. Other than the above, the details of the tire structure, or the material of each member or the like is particularly restricted, and the present invention can be constituted by appropriately selecting conventionally known structures or materials.

For example, although in the illustrated examples, a cap layer 3 and a layered layer 4 are provided on the outside in the tire radial direction of the belt layers 2a, 2b, these arrangements are optional in the present invention and may not be provided. The cap layer 3 and layered layer 4 are each formed by rubberizing organic fiber cords arranged substantially in parallel with respect to the tire circumferential direction. As illustrated, at least one layer of the cap layer 3 is arranged across the full or longer lengths of the belt layers 2a, 2b; at least one layer of the layered layer 4 is arranged at the both end regions of the belt layers 2a, 2b.

As illustrated, in each of a pair of bead portions 11 of a tire of the present invention, a bead core 5 is embedded, and a carcass 1 is turned up around the bead core 5 from the inside of the tire to the outside of the tire to be engaged. Further, on the periphery of the crown portion of the belt layers 2a, 2b, a tread portion 12 is arranged; on the side portion of the carcass 1, a side wall portion 13 is arranged, respectively. Still further, on the surface of the tread portion 12, a tread pattern is appropriately formed, and in the innermost layer, an inner liner (not illustrated) is formed. Still further, in the tire of the present invention, as an air to be filled in the tire, a normal air or an air whose oxygen partial pressure is varied, or an inert gas such as nitrogen can be used.

EXAMPLES

Figure 3:
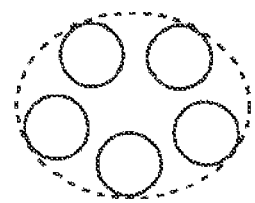
FIG. 3 is a schematic cross-section illustrating a steel cord used in Examples.
Figure 4:
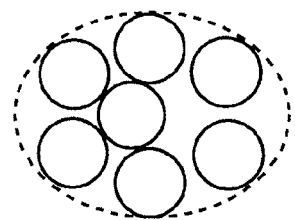
FIG. 4 is a schematic cross-section illustrating another steel cord used in Examples.
Figure 5:
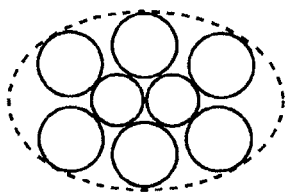
FIG. 5 is a schematic cross-section illustrating still another steel cord used in Examples.

The present invention will now be described in detail by way of Examples. Pneumatic tires of individual Examples and Comparative Examples were manufactured in a tire size of 265/70R16 according to the conditions illustrated in the Table below. One layer of carcass was used and the material of ply cord was polyester. Two belt layers were arranged being crossed each other such that the cord angles were ±26° with respect to the tire circumferential direction. FIG. 3 illustrates a schematic cross-section of steel cords having a 1×5 structure of Comparative Examples 1, 3; FIG. 4 illustrates a schematic cross-section of steel cords having a 1+6 structure of Comparative Example 2, 4; and FIG. 5 illustrates a schematic cross-section of steel cords having a 2+6 structure of Comparative Example 5 and Examples 1 to 6.

For each of the obtained test tire, evaluation of the BES resistance and the weight of the belt per unit area was performed according to the following. The results are illustrated in the Table below in combination.

[Evaluation of BES Resistance]

Individual test tires were mounted on a normal rim specified in JATMA, inflated to an inner pressure of 220 kPa and pressed against a test drum in a state in which 955 kg load was loaded, and then the tire was run at 90 km/h until a failure on the end portion of the belt (separation) occurred. The results were indicated as an index of a running distance until a failure occurred, taking the distance until a failure of a tire of Comparative Example 1 occurred as 44. The larger the value, the longer the running distance until a BES occurred, which represents excellent resistance.

[Evaluation of the Weight of Belt]

The weight of each of the belts per unit area was measured and indicated as index taking the weight of the Comparative Example 1 as 100. The smaller the value, the more excellent the lightweight properties.

For each of the obtained test tires, the total strength of the belt was determined and indicated as an index taking the Comparative Example 1 as 100. The larger the value, the higher the total strength of the belt, which may have an excellent resistance. Based on the result, the plunger energy (PE) was evaluated. When the value was 115 or higher, the evaluation was indicated as ⊚; when the value was 106 to 114, the evaluation was indicated as ○; and when the value was 105 or lower, the evaluation was indicated as x. For the BES resistance, when the value was 115 or higher, the evaluation was indicated as ⊚; when the value was 86 to 114, the evaluation was indicated as ○; and when the value was 85 or lower, the evaluation was indicated as x. Still further, for the unit weight of the belt layer, when the value was 109 or lower, the evaluation was indicated as ○; when the value was 110 to 130, the evaluation was indicated as ○; and when the value was 131 or higher, the evaluation was indicated as x. Based on these evaluation results, for the overall evaluation, when there was no x and two or more ⊚, the evaluation was ⊚; when there was no x and one ⊚, the evaluation was ○; and when there was x, the evaluation was x. These results are illustrated in combination in the Table below.

TABLE 1

| | Belt layer conditions | | | | | | Evaluation | | | | |
|---|---|---|---|---|---|---|---|---|---|---|---|
| | | Wire diameter | | | Total | | | | | | |
| | Cord structure | Core/Sheath (mm) | End count (/50 mm) | Belt layer gauge (mm) | strength of the belt (index) | Cord interval (mm) | BES resistance (index) | Unit weight (index) | PE | BES resistance | Weight | Overall evaluation |
| Comparative Example 1 | 1 × 5 | 0.22 | 36.0 | 1.10 | 100 | 0.67 | 44 | 100 | X | X | ⊚ | X |
| Comparative Example 2 | 1 + 6 | 0.23 0.24 | 22.0 | 1.34 | 102 | 1.40 | 127 | 112 | X | ⊚ | ○ | X |
| Comparative Example 3 | 1 × 5 | 0.22 | 36.0 | 1.10 | 115 | 0.67 | 44 | 100 | ⊚ | X | ⊚ | X |

TABLE 1-continued

| | | Belt layer conditions | | | | | Evaluation | | | | | |
|---|---|---|---|---|---|---|---|---|---|---|---|---|
| | | Wire | | | Total | | | | | | | |
| | Cord structure | diameter Core/Sheath (mm) | End count (/50 mm) | Belt layer gauge (mm) | strength of the belt (index) | Cord interval (mm) | BES resistance (index) | Unit weight (index) | PE | BES resistance | Weight | Overall evaluation |
| Comparative Example 4 | 1 + 6 | 0.23 0.24 | 24.0 | 1.22 | 112 | 1.21 | 85 | 109 | ○ | X | ◎ | X |
| Comparative Example 5 | 2 + 6 | 0.18 0.225 | 22.1 | 1.11 | 115 | 1.39 | 80 | 111 | ◎ | X | ○ | X |
| Example 1 | 2 + 6 | 0.18 0.225 | 22.1 | 1.25 | 115 | 1.39 | 126 | 118 | ◎ | ◎ | ○ | ◎ |
| Example 2 | 2 + 6 | 0.18 0.225 | 26.0 | 1.22 | 115 | 1.09 | 101 | 110 | ◎ | ○ | ○ | ○ |
| Example 3 | 2 + 6 | 0.18 0.225 | 24.0 | 1.22 | 115 | 1.25 | 116 | 106 | ◎ | ◎ | ◎ | ◎ |
| Example 4 | 2 + 6 | 0.18 0.225 | 26.0 | 1.22 | 124 | 1.09 | 101 | 110 | ◎ | ○ | ○ | ○ |
| Example 5 | 2 + 6 | 0.18 0.225 | 24.0 | 1.60 | 115 | 1.25 | 197 | 126 | ◎ | ◎ | ○ | ◎ |
| Example 6 | 2 + 6 | 0.18 0.225 | 26.0 | 1.60 | 124 | 1.09 | 172 | 130 | ◎ | ◎ | ○ | ◎ |

As illustrated in the Table above, it was confirmed that, in each Example which satisfies the condition of the present invention, both the plunger energy and the BES resistance were excellent, and the lightweight properties was secured.

Description of Symbols

1 Carcass
2a, 2b Belt layer
3 Cap layer
4 Layered layer
5 Bead core
11 Bead portion
12 Tread portion
13 Side wall portion

The invention claimed is:

1. A pneumatic tire comprising at least one carcass extending toroidally between a pair of bead portions as a skeleton, and at least two belt layers each formed by rubberizing a plurality of steel cords arranged obliquely with respect to the tire circumferential direction on the outside in the tire radial direction of the crown portion of the carcass, wherein the steel cord is composed of two core wires and six sheath wires twisted together around the core wires; the interval between adjacent steel cords in each belt layer is not less than 1.09 mm and not more than 1.39 mm; and the gauge of the belt layer is not less than 1.22 mm and not more than 1.60 mm, in the steel cord, the wire diameter dc of the core wire differs from the wire diameter ds Of the sheath wire, and the ratio of the wire diameter ds of the sheath wire to the wire diameter dc of the core wire satisfies ds/dc>1.2.

2. A pneumatic tire comprising at least one carcass extending toroidally between a pair of bead portions as a skeleton, and at least two belt layers each formed by rubberizing a plurality of steel cords arranged obliquely with respect to the tire circumferential direction on the outside in the tire radial direction of the crown portion of the carcass, wherein the steel cord consists of two core wires and six sheath wires twisted together around the core wires; the interval between adjacent steel cords in each belt layer is not less than 1.09 mm and not more than 1.39 mm; and the gauge of the belt layer is not less than 1.22 mm and not more than 1.60 mm, in the steel cord, the core wires are arranged in parallel without being twisted together, in the steel cord, the wire diameter dc of the core wire differs from the wire diameter ds of the sheath wire, and the ratio of the wire diameter ds of the sheath wire to the wire diameter dc of the core wire satisfies ds/dc>1.2.

* * * * *